Feb. 10, 1931.  M. L. LITTLE  1,791,871

PARACHUTE FOR AIRPLANES

Filed Feb. 14, 1929

INVENTOR
MARY L. LITTLE
R S Berry
BY
ATTORNEY

Patented Feb. 10, 1931

1,791,871

UNITED STATES PATENT OFFICE

MARY L. LITTLE, OF LONG BEACH, CALIFORNIA

PARACHUTE FOR AIRPLANES

Application filed February 14, 1929. Serial No. 339,839.

This invention relates to airplanes and more specifically deals with a safety device for landing airplanes in cases of emergency.

An object of this invention is to equip an airplane with a parachute which may be positively operated in cases of emergency.

Another object is to attach a parachute to an airplane in such a manner that when the parachute is released, the airplane is carried with the maximum stability.

Another object is to store the parachute on top of the cabin. In this position, the parachute is ready for instantaneous use, is substantially free from any entanglements and may serve as a covering for the cabin.

Another object is to provide holding means that return the parachute intact when not in use.

Another object is to provide mechanism whereby said holding means are instantly converted into releasing means, that positively and effectively operate to force the parachute to open.

Briefly stated, my invention contemplates incorporating as a permanent part of an airplane, a parachute or a plurality of parachutes that can be stored, when not in use, upon the top of the cabin and may form a roof for the same if desirable, together with means operable from within the cabin for surely and effectively releasing said parachute in cases of emergency.

The foregoing objects and advantages, together with any subsequent features that may be developed in the specification and claims, constitute my invention, one embodiment of which is shown and illustrated by way of example in the accompanying drawing, in which:

Figure 1:
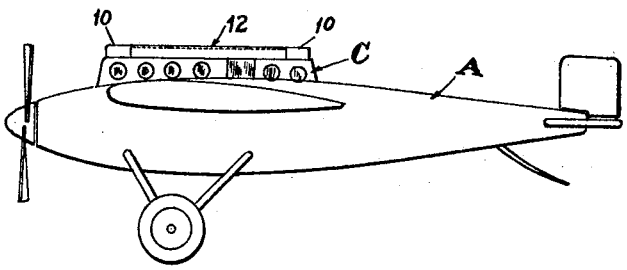
Fig. 1 is a side elevation of an airplane with my parachute incorporated therewith, showing it in a collapsed or stored position.
Figure 2:
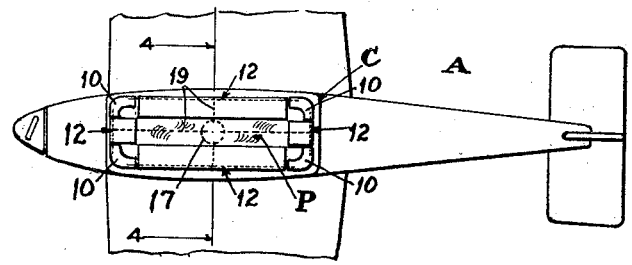
Fig. 2 is the same with the parachute released.

Referring to the drawing more specifically, wherein my device is shown mounted on the top of the cabin C, which is the ordinary type of cabin built into airplanes, such as A.

The airplane A and the other equipment contained therein, enter into this invention only in a broad way, therefore, no detailed description of such will be entered here. Suffice it, to say that this invention is applicable to any airplane either with cabins or without. In an airplane with no cabin, it would be necessary to mount some support similar to a cabin roof over the cock pit and the invention becomes equally serviceable.

The ensuing description will therefore deal more minutely with the means for mounting, storing and releasing a parachute from an airplane in cases of emergency.

Figure 3:
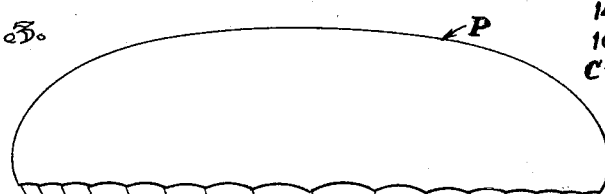
Fig. 3 is a fragmentary top plan view of Fig. 1.

The means for permanently attaching a parachute to an airplane in the manner just described, comprises four corner pieces 10 rigidly mounted and securely fixed to the top of the cabin C at each corner thereof, as shown in Fig. 3.

Figure 4:
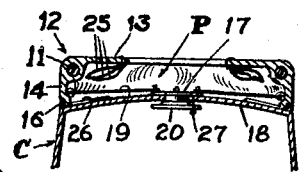
Fig. 4 is a section on line 4—4 of Fig. 3, showing the parachute in stored position.

Each piece 10 forms an airtight corner and is cowled slightly inward at the top. Extending between each corner piece 10, is a rigid bar 11 which is securely mounted at each end into the corner pieces. Hingedly mounted on each bar 11, is a guard designated by 12 formed with guard members 13 and 14 extending at right angles to each other. As shown in Fig. 4, the guard member 13 when in closed position, is adapted to lay on top of the folded parachute and hold it against wind pressure. The proper length of the guard member 13 can be determined by practice. The guard member 14 is adapted to abut the rail 16 on the roof of the cabin C and form an air tight closure therewith.

As a means of releasing the parachute P, I have provided a rotatable disk 17 centrally located on the top of the cabin roof 18. To the disk 17, I have swivelably attached rods 19, which in turn are pivotally attached at their outer ends to the lower edge of the guard member 14. The disk 17 is rotatably mounted upon the roof 18 of the cabin C and is controlled by a hand wheel 20, which extends into the interior of the cabin C.

This arrangement provides a centrally located means of releasing said parachute, that is available to all occupants of the cabin. However, any other means, such as a lever mounted near the pilot's seat, is equally adaptable. I therefore, do not confine myself to the above specific mechanism.

Figure 5:
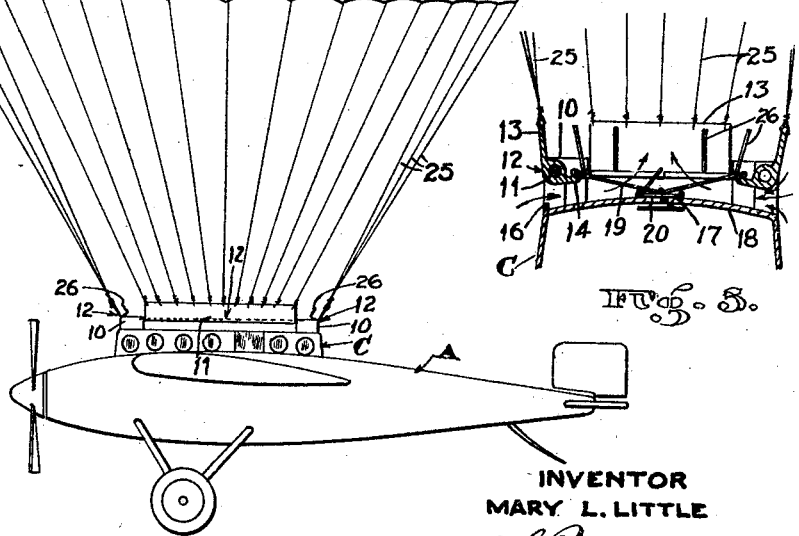
Fig. 5 is the same section, showing the parachute released.

In mounting the parachute P, I first fasten the ropes 25, which are the supporting ropes of the parachute, to the edge of the guard members 13 properly spacing them so that the strain of supporting the plane is equally distributed. I then place the fabric part of the parachute on the roof of the cabin and lay the ropes along the edge under the guard member 13. As a precaution against the weight of the ropes 25 holding down the edge of the parachute P against wind pressure when the guard 12 is in the position shown in Fig. 5, I have equipped each guard with a set of fingers 26 which tend to pick up the weight of the rope and also lift the edge of the parachute, thus forcing air under the parachute and causing it to rise in the center.

In operation, in cases of emergency, the hand wheel 20 is unlocked and given a quick turn. The instantaneous action of the air sweeping under the guard member 14 causes the parachute to immediately rise in the center and having started the operation continues to completion.

In respect to the hand wheel, it may be found desirable to lock it in closed position, but since this is a common expedient, no mechanism is shown outside of a pin 27 which extends through the hand wheel into the roof of the cabin C.

Having set forth my invention, I am aware that many modifications may be resorted to without in any way departing from the scope of the specification, nor the purview of the appended claims, I therefore, reserve the right to such modification.

I claim:

1. In combination with an airplane having a cabin, a parachute, means on top of said cabin for holding said parachute when collapsed, means for attaching said parachute to the top of the cabin in such a manner as to space the points of attachment on substantially the perimeter of the roof of said cabin, and means for releasing the parachute by an occupant within the cabin, said last mentioned means comprising guards adapted to hold the parachute down when closed and to force air under the parachute when opened.

2. A parachute attachment for airplanes comprising a parachute, a support for holding said parachute in a folded position, a pair of hinged guards overlapping opposed marginal portions of the folded parachute for holding said parachute in place; manually operable means for swinging said guards to release said parachute, and fingers on said guards arranged to project beneath the edges of the folded parachute and disposed to move upwardly on swinging said guard when releasing said parachute.

3. A parachute attachment for airplanes comprising, a parachute, a support therefor on which said parachute may be folded, a pair of hinged guards extending along opposed sides of said parachute, said guards including portions extending over the upper margins of the folded parachute and portions extending downwardly along opposed margins of the folded parachute; fingers on said guards projecting beneath the folded parachute, and manually operable means for swinging said guards to release the parachute.

4. In a parachute attachment for airplanes, a parachute, a support on which said parachute may be folded, a pair of hinged guards extending along the margin of the folded parachute and projecting thereabove, links connected to said guards, manually operable means connected to said links for advancing and retracting said links to effect rocking of said guards, and means included in said guards for lifting the opposed margins of the parachute or swinging said guards in one direction.

In testimony whereof, I have affixed my signature.

MARY L. LITTLE.